US012490086B2

(12) United States Patent
Xin et al.

(10) Patent No.: US 12,490,086 B2
(45) Date of Patent: Dec. 2, 2025

(54) WIRELESS NETWORK PROTOCOL ALLOWING THE SAME SCRAMBLING SEED TO BE UTILIZED BY MULTIPLE STAs

(71) Applicants: SONY GROUP CORPORATION, Tokyo (JP); SONY CORPORATION OF AMERICA, New York, NY (US)

(72) Inventors: Liangxiao Xin, Santa Clara, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 244 days.

(21) Appl. No.: 18/322,797

(22) Filed: May 24, 2023

(65) Prior Publication Data

US 2024/0007852 A1 Jan. 4, 2024

Related U.S. Application Data

(60) Provisional application No. 63/371,409, filed on Aug. 15, 2022, provisional application No. 63/367,336, filed on Jun. 30, 2022.

(51) Int. Cl.
*H04L 9/08* (2006.01)
*H04W 12/037* (2021.01)
*H04W 12/08* (2021.01)
*H04W 12/122* (2021.01)
*H04W 56/00* (2009.01)
*H04W 74/0816* (2024.01)
*H04W 84/12* (2009.01)

(52) U.S. Cl.
CPC ......... *H04W 12/037* (2021.01); *H04L 9/0869* (2013.01); *H04W 12/08* (2013.01); *H04W 12/122* (2021.01); *H04W 56/001* (2013.01); *H04W 74/0816* (2013.01); *H04W 84/12* (2013.01)

(58) Field of Classification Search
CPC ... H04W 12/037; H04L 9/0869; H04L 9/0816
See application file for complete search history.

(56) References Cited

U.S. PATENT DOCUMENTS

| 7,039,190 | B1 * | 5/2006 | Engwer | H04L 9/3271 380/247 |
| 10,321,405 | B2 * | 6/2019 | Atefi | H04W 52/0245 |
| 11,044,673 | B2 * | 6/2021 | Atefi | H04W 52/0229 |
| 2005/0094640 | A1 * | 5/2005 | Howe | H04L 47/2416 370/474 |
| 2006/0133381 | A1 | 6/2006 | Wang | |
| 2008/0198789 | A1 | 8/2008 | Brown | |

(Continued)

*Primary Examiner* — Ponnoreay Pich
(74) *Attorney, Agent, or Firm* — O'BANION & RITCHEY LLP; John P. O'Banion

(57) ABSTRACT

Using this described protocol an AP can control multiple STAs to allow them to utilize the same scrambling seed to scramble the data in identical data units being sent on the wireless network. The AP sends a scrambling seed indication within a frame communicated to other STAs on the network. These other STAs, then use this scrambling seed indication to scramble a data field of a data unit with an identical scrambling seed, and to transmit these packets using the same modulation and coding scheme (MCS).

19 Claims, 6 Drawing Sheets

(56) References Cited

U.S. PATENT DOCUMENTS

| | | | |
|---|---|---|---|
| 2010/0034161 A1* | 2/2010 | Luo | H04W 74/0833 |
| | | | 375/295 |
| 2016/0021669 A1* | 1/2016 | Tetzlaff | H04L 1/00 |
| | | | 370/278 |
| 2016/0316468 A1* | 10/2016 | Huang | H04L 5/0037 |
| 2016/0353485 A1* | 12/2016 | Wentink | H04W 74/06 |
| 2018/0102876 A1 | 4/2018 | Johnson | |
| 2020/0359458 A1* | 11/2020 | Xiong | H04W 72/0466 |
| 2021/0289554 A1* | 9/2021 | Lou | H04W 72/541 |
| 2021/0360465 A1* | 11/2021 | Henry | H04W 8/245 |
| 2021/0377728 A1* | 12/2021 | Min | H04W 12/037 |
| 2023/0137826 A1* | 5/2023 | Ajami | H04L 5/0055 |
| | | | 370/329 |
| 2024/0007852 A1* | 1/2024 | Xin | H04W 12/037 |

\* cited by examiner

WIRELESS NETWORK PROTOCOL ALLOWING THE SAME SCRAMBLING SEED TO BE UTILIZED BY MULTIPLE STAs

CROSS-REFERENCE TO RELATED APPLICATIONS

This application claims priority to, and the benefit of, U.S. provisional patent application Ser. No. 63/367,336 filed on Jun. 30, 2022, incorporated herein by reference in its entirety. This application also claims priority to, and the benefit of, U.S. provisional patent application Ser. No. 63/371,409 filed on Aug. 15, 2022, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to scrambled wireless network communications, and more particularly to scrambling performed under IEEE 802.11.

2. Background Discussion

Current IEEE 802.11 wireless networking can use a scrambler to scramble the data field of a Physical Layer Protocol Data Unit (PPDU) to reduce the probability of sending long sequences of 0 s and 1 s, and thus creating security vulnerabilities. The scrambler is initialized with a pseudorandom nonzero seed to generate a scrambling sequence. Then, the string of data bits are exclusive-ORed (XORed) with the scrambling sequence. Different users in a Very High Throughput (VHT) Multiple-user (MU) Physical Layer Protocol Data Unit (PPDU) may use different pseudorandom nonzero seeds.

However, there are collision issues which arise with the present use of scrambling under IEEE 802.11.

Accordingly, a need exists for enhanced IEEE 802.11 protocols which overcome these scrambling issues. The present disclosure fulfills that need and provides additional benefits over existing systems.

BRIEF SUMMARY

An apparatus and network protocol for wireless stations (STAs) transmitting Physical Layer Protocol Data Units (PPDUs) according to a Carrier Sense Multiple Access/Collision Avoidance (CSMA/CA) mechanism and using Enhanced Distributed Channel Access (EDCA) for random channel access on all the links.

At least a portion of the communications are scrambled for security reasons, using a scrambling seed. An Access Point (AP) station sends a scrambling seed indication within a frame communicated to other STAs on the network. More than one receiving non-AP STA uses this scrambling seed indication for scrambling a data field of a Physical layer Protocol Data Unit (PPDU) using the identical scrambling seed, and then each transmits their respective PPDU using the same modulation and coding scheme (MCS). There are numerous additional variations and enhancements described as well.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

1. Introduction

1.1. State of the Art Scrambler

Figure 1:
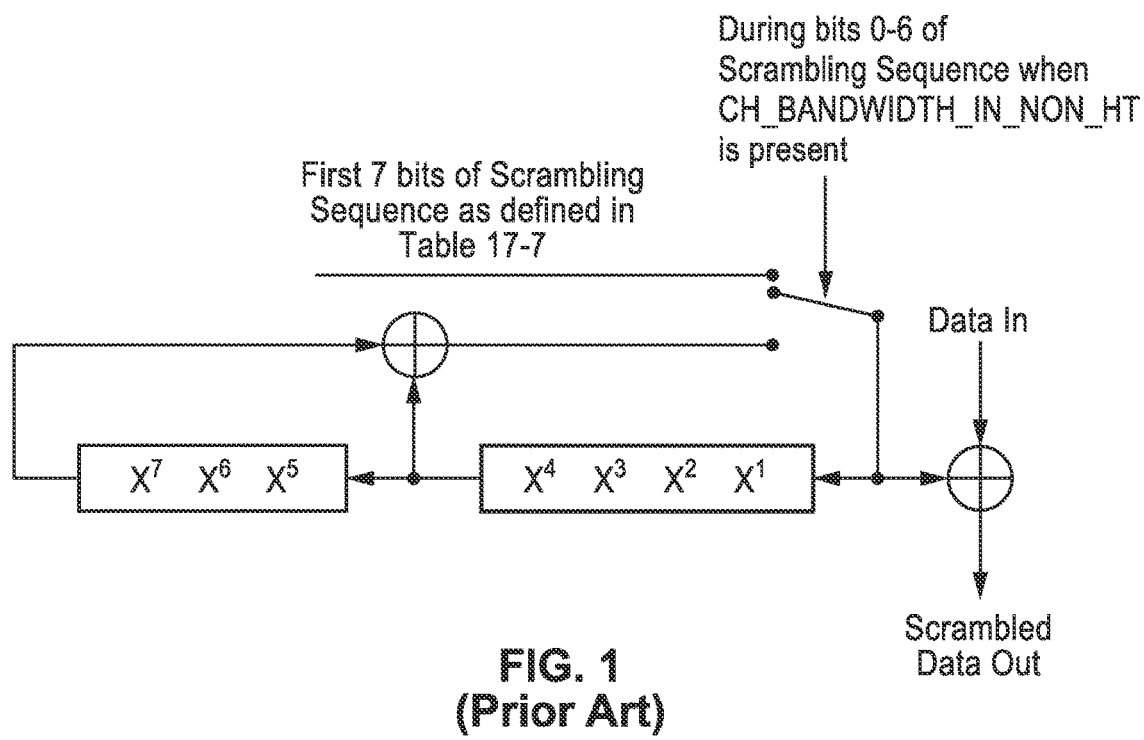
FIG. 1 is a state of the art scrambler as described in IEEE Draft P802.11 REVmd D5.0.

FIG. 1 depicts a state of the art scrambler as described in IEEE Draft P802.11 REVmd D5.0, relevant portions of which are described in this section. The DATA field, composed of SERVICE, PSDU, tail, and pad parts, shall be scrambled with a length-127 Physical Layer Protocol Data Unit (PPDU)-synchronous scrambler. The octets of the PSDU are placed in the transmit serial bit stream, bit 0 first and bit 7 Last. The PPDU synchronous scrambler uses the generator polynomial S as follows and is illustrated in the Data scrambler figure.

$$S(x)=x^7+x^4+1 \quad \text{(Eq. 1)}$$

It will be noted that the 127-bit sequence generated repeatedly by the scrambler is (leftmost used first) 00001110 11110010 11001001 00000010 00100110 00101110 10110110 00001100 11010100 11100111 10110100 00101010 11111010 01010001 10111000 1111111, when an all one's initial state is used.

The same scrambler is used to scramble transmit data and to descramble received data. If the TXVECTOR parameter CH_BANDWIDTH_IN_NON_HT is not present when transmitting; then the initial state of the scrambler shall be set to a pseudorandom nonzero state.

If the TXVECTOR parameter CH_BANDWIDTH_IN_NON_HT is present; then, the first 7 bits of the scrambling sequence shall be set as shown in Table 1, which depicts contents of the first 7 bits of the scrambling sequence, while Table 2 depicts field values for TXVECTOR parameter CH_BANDWIDTH_IN_NON_HT values, and Table 4 depicts DYN_BANDWIDTH_IN_NON_HT values, and these shall also be used to initialize the state of the scrambler.

The scrambler with this initialization shall generate the remainder (i.e., after the first 7 bits) of the scrambling sequence as shown in FIG. 1.

CH_BAND'WIDTH_IN_NON_HT is transmitted LSF first. For example, if CBW80 has a value of 2, which is 10 in binary representation, then B5=0 and B6=1.

if the TXVECTOR SCRAMBLER_RESET is set to RESET_SCRAMBLER and dot11 MACPrivacyActivated is true, then the initial state of the scrambler shall be set to a non-zero random value not based on the scrambler value at the end of the last transmitted PPDU, before changes based on CH_BANDWIDTH_IN_NON_HT defined above are applied.

During reception by the VHT STA RXVECTOR parameter CH_BANDWIDTH_IN_NON_HT shall be determined from selected bits in the scrambling sequence as shown in Table 1 depicting contents of the first 7 bits of the scrambling sequence, and Table 3 depicting RXVECTOR parameter CH_BANDWIDTH_IN_NON_HT values. During reception by a VHT STA, the RXVECTOR parameter DYN_BANDWIDTH_IN_NON_HT shall be set to selected bits in the scrambling sequence as shown in Table 1 depicting the contents of the first 7 bits of the scrambling sequence. These fields shall be interpreted as being sent Least Significant bit (LSB) first.

It should be noted (Note 1) that the receiving PHY cannot determine whether the CH_BANDWIDTH_IN_NON_HT and DYN_BANDWIDTH_IN_NON_HT parameters were present in the TXVECTOR of the transmitting PHY; therefore, the receiving PHY in a VHT STA always includes values for the CH_BANDWDTH_IN_NON_HT and DYN_BANDWIDTH_IN_NON_HT parameters in the RXVECTOR if the PPDU is a non-HT PPDU. It is the responsibility of the MAC to determine the validity of the RXVECTOR parameters CH_BANDWIDTH_IN_NON_HT and DYN_BANDWIDTH_IN_NON_HT.

It should be noted (Note 2) that the receiving PHY cannot determine whether the TXVECTOR parameter CH_BANDWIDTH_IN_NON_HT was present, but it does not matter since descrambling the DATA field is the same either way.

The seven LSBs of the SERVICE field shall be set to all 0's prior to scrambling to enable estimation of the initial state of the scrambler in the receiver.

1.2. Problem Description

When multiple STAs contend for the channel by counting down backoff counters, their backoff counters may reach zero at the same time. Then a collision occurs since those STAs with backoff counters equal to zero, all access the channel and start to transmit at the same time.

When multiple STAs access the channel at the same time, one possible solution which solves the collision issue is to allow those STAs to send the same PPDU (signal) to the AP to occupy the channel and then let the AP allocate channel resources for transmissions of those STAs. In order to make the signal of the PPDUs sent by multiple STAs the same, it requires that those STAs use the same scrambling seed for the same PPDU.

In some special occasions, such as Reserved-Target Wait Time (R-TWT) SP, multiple member STAs of the R-TWT SP start to contend for the channel together to transmit their low latency traffic. This causes high probability that those member STAs count down backoff counters to zero at the same time and cause the collision. This results in the extra delay of the low latency traffic and thus the Quality-of-Service (QoS) requirement of the low latency traffic may not be met.

In some special occasions, as illustrated as examples in this disclosure, it would be acceptable for multiple STAs to transmit some specific frames to the associated AP simultaneously which could be more efficient for AP not considering these simultaneously transmitted frames as collisions, which cause further retransmissions. However, since these simultaneously transmitted frames have a different scrambling seed, the AP will take them as different frames that collide at the AP's receiver antenna unless they use the same scrambling seed.

1.3. Contribution of the Present Disclosure

By utilizing the disclosed technologies, multiple STAs utilized the same scrambling seed to scramble an identical PPDU, using the same Modulation Coding Scheme (MCS), to avoid a collision when they access the channel and transmit the first PPDU during the TXOP. Those STAs may contend for the channel together and there is a high probability that more than one of those STAs will access the channel at the same time. For example, those STAs could be the member STAs of the same R-TWT schedule and start to contend for the channel at the beginning of the R-TWT SP for their low latency traffic. Using an identical PPDU allows sharing the TXOP with their associated AP (or R-TWT scheduling AP in R-TWT scenario) and allows the AP to act as the TXOP holder. In such methods, even if more than one STA accesses the channel at the same time, a collision does not occur.

By utilizing the disclosed technologies, the AP shares the same scrambling seed with a group of its associated STAs that can be used to scramble the identical PPDU (under special circumstances). The scrambling seed can consist of several bits of pseudorandom integer and/or several bits of static integer that identifies the occasions. For example, the static integer can reflect the R-TWT ID, Timing Synchronization Function (TSF) time, AP address. That information can be used by the receiver of the identical PPDU to identify the occasion in which the scrambling seed is used.

2. Embodiments of the Present Disclosure

2.1. Communication Station (STA and MLD) Hardware

Figure 2:
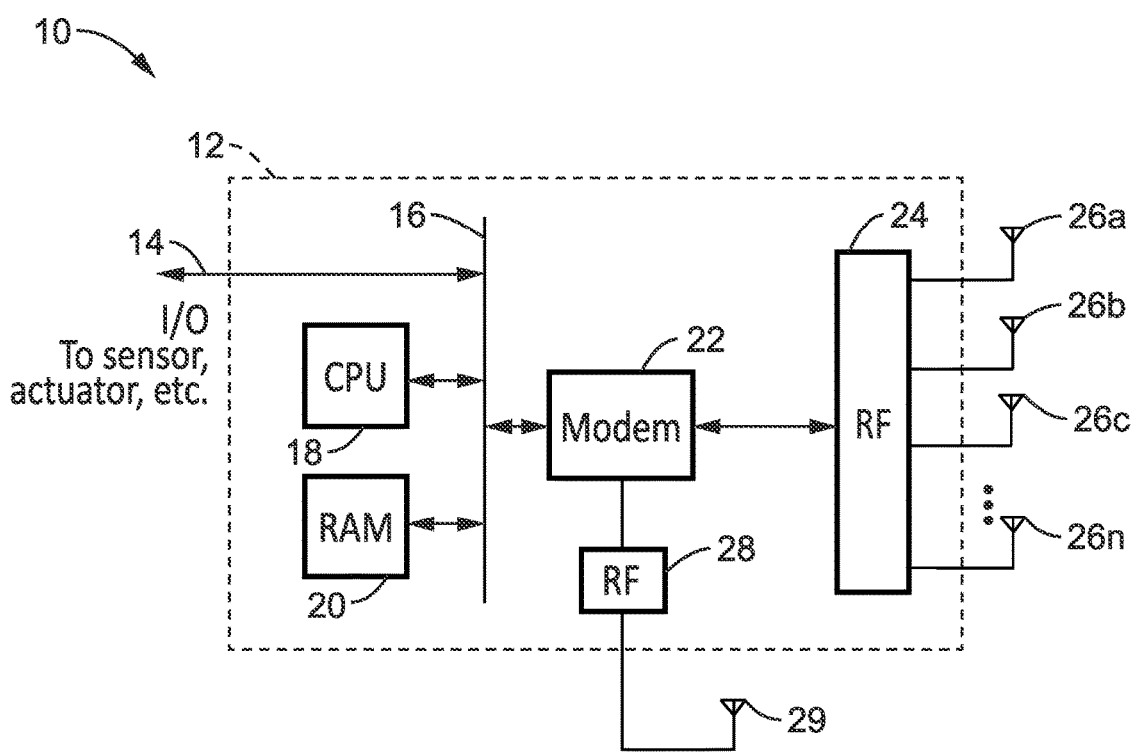
FIG. 2 is a block diagram of communication station hardware, according to at least one embodiment of the present disclosure.

FIG. 2 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 3:
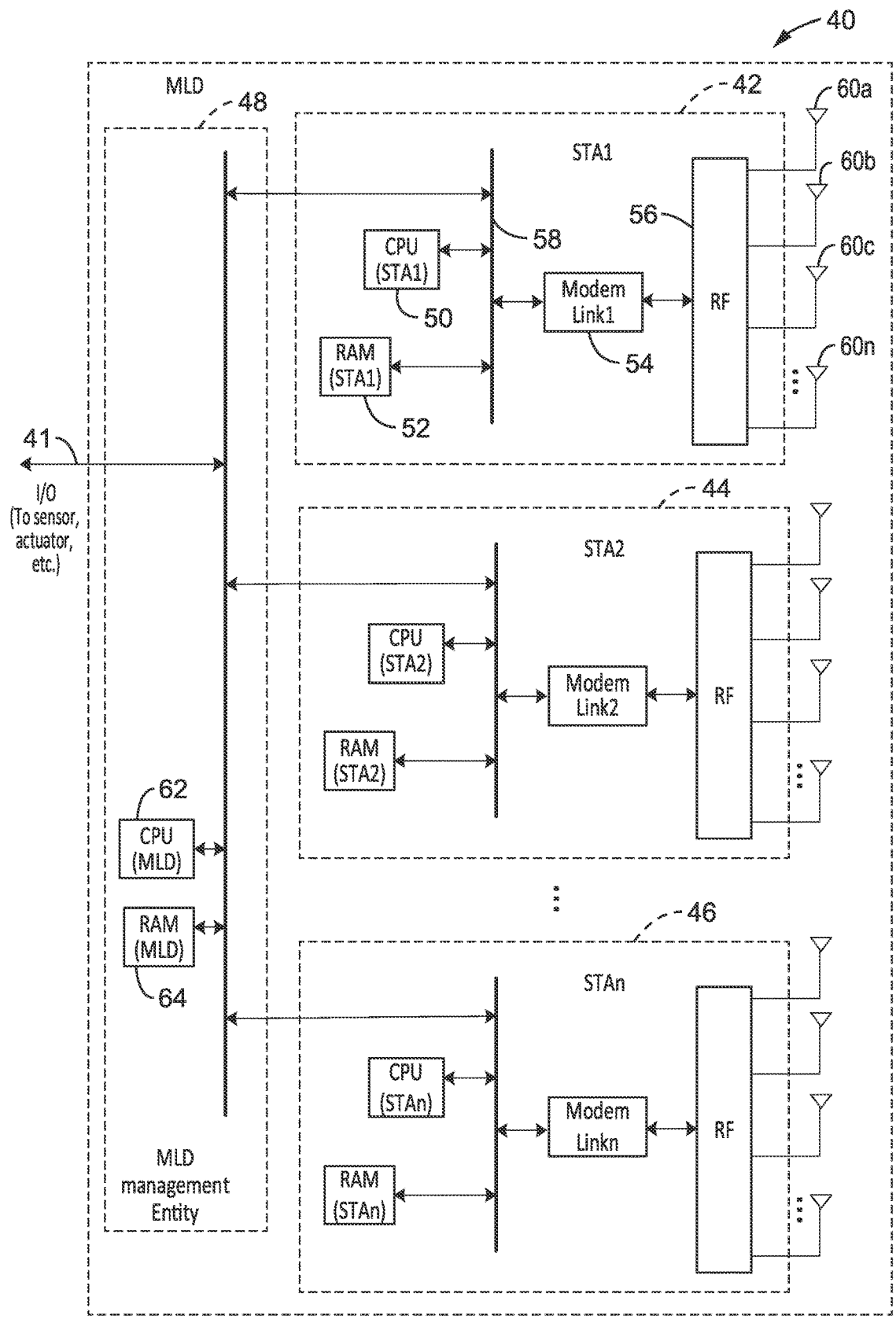
FIG. 3 is a block diagram of Multi-Link Device (MLD) hardware according to at least one embodiment of the present disclosure.

FIG. 3 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

3. Scrambling Seed for Multiple STAs

The goal of the proposed technologies allows multiple STAs to use the same scrambling seed to scramble an identical PPDU when those STAs are to transmit that PPDU at the same, or similar, timeframe. If those STAs also use the same MCS to transmit the PPDU, then the collision does not arise even if more than one STA transmits the PPDU at the same time.

3.1. Contents of Scrambling Sequence

Table 5 illustrates the contents of the first 7 bits of the scrambling sequence according to the present disclosure. Those first 7 bits are used as the same scrambling seed for multiple STAs to scramble an identical PPDU.

For TXVECTOR, the first 7 bits of the scrambling sequence consist of x-bit pseudorandom integers, and y-bit integers are generated depending on R-TWT ID/TSF time/AP.

The x-bit pseudorandom integer can be generated by the following options. Option1: the AP generates the random integer and shares it with multiple STAs, and those STAs always use that integer as a scrambling seed for certain PPDUs. Option2: the AP shares the same pseudorandom number sequence seed with multiple STAs. Those STAs use the same pseudorandom number sequence generation algorithm with the same seed to generate the same pseudorandom number sequence. STAs will pick a random number having the same index in the pseudorandom number sequence. The index of the random number can be changed depending on the Timing synchronization function (TSF) time. The y-bit integer does not change, if its reference information does not change.

For RXVECTOR, the x-bit pseudorandom integer is random depending on the received PPDU. The y-bit integer can be used to identify the referring information, such as R-TWT ID, TSF time, and AP address. If those y-bit integers do not match what the AP expects to receive, then the received PPDU is considered an unauthorized/illegal PPDU, and the AP may discard it.

The number x and y can be an integer between 0 and 7.

3.2. Scrambling Seed Element

A scrambling seed element is used by the AP to share the same scrambling seed which the non-AP STAs should use to scramble an identical PPDU when they transmit the identical PPDU as the first PPDU in the TXOP in certain occasions, such as during service periods (SPs) when indicating the element to the AP. Then, the non-AP STAs which receive this element should use the same scrambling seed to scramble the identical PPDU during the SPs.

Figure 4:
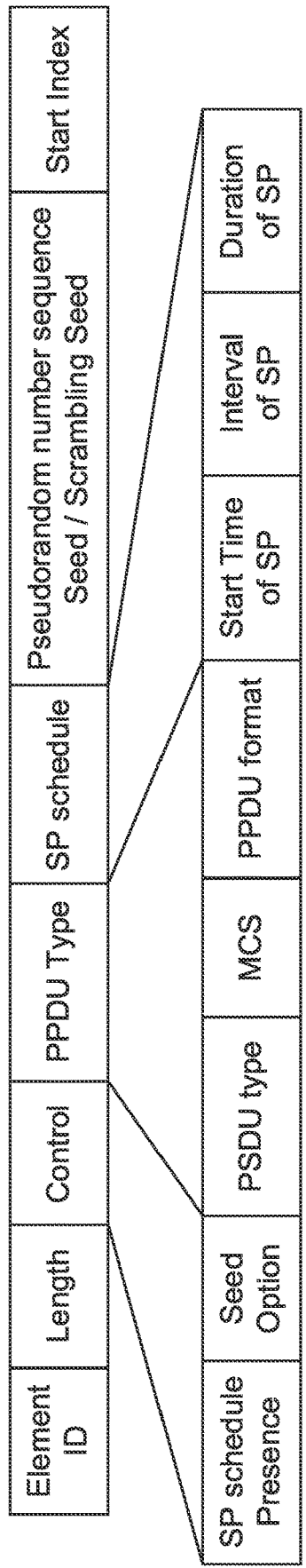
FIG. 4 is a data field diagram of a scrambling seed element, according to at least one embodiment of the present disclosure.

FIG. 4 illustrates an example embodiment 70 of a scrambling seed element having the following fields and subfields.

An Element ID field indicates the type of element. A Length field indicates the length of the element.

A Control field is set to indicate the format of the element. Within this control field, a Service Period (SP) schedule presence subfield is set to indicate the presence of the SP schedule field in the element. This field can be implemented as a one bit indication. For example, when this field is set to a first state (e.g., "1"), the SP schedule field is present in the element. Otherwise, if this field is set to a second state (e.g., "0") then the SP schedule field is not present in the element. A Seed Option subfield is set to a first state (e.g., "1"), indicating that the Pseudorandom number sequence seed/scrambling seed field is a scrambling seed, and the start index field is not present. Otherwise, this field is set to a second state (e.g., "0"). The Pseudorandom number sequence seed/scrambling seed field is set to pseudorandom number sequence seed and the start index field is present in the element.

A PPDU type field is set to indicate the type of identical PPDU for which the receiver of the element should use the same scrambling seed indicated in the element to scramble the transmission. Within the PPDU type field is a PHY Service Data Unit (PSDU) type subfield which indicates the PSDU of the identical PPDU for which the same scrambling seed is used. For example, this field can be set to Clear-To-Send (CTS) frame, which indicates that the same scrambling seed should be used when they transmit a CTS frame to the AP as the first PPDU in the TXOP. An MCS subfield is set to indicate the MCS that the receiver uses to send the identical PPDU. Also, a PPDU format subfield is set to indicate the PPDU format, such as High Throughput (HT), non-HT, Extra High Throughput (EHT) Single User (SU), of the identical PPDU that the receiver uses to transmit.

An SP schedule field is set to indicate the time during which the receiver STA uses the same scrambling seed to scramble the identical PPDU. When the indicated time is not within the time of the SP schedule, then the receiver STA is not to use the same scrambling seed to scramble the identical PPDU. Within the SP schedule field are the following fields. A Start Time of SP subfield is set to a TSF time to indicate the first start time of a SP during which the receiver STA uses the same scrambling seed as indicated in the element. An Interval field of SP subfield is set to the interval time between the start time of the consecutive SPs. A Duration subfield indicates the duration of each SP.

A Pseudorandom number sequence seed field can be set to any (non-zero) integer that can be used as the seed to generate a sequence of numbers (discussed in a previous section as Option 2 of Table 5). The receiver STA of the element uses the numbers in the sequence as the scrambling seed to scramble the PPDU. For example, the receiver STA will use another number (e.g., the number of the next index in the sequence) in the sequence of numbers generated by Pseudorandom number sequence seed field during the next SP.

The scrambling seed field can be set to any (non-zero) integer. This integer is the same scrambling seed (discussed in a previous section as Option 1 of Table 5) that the non-AP STAs use to scramble the identical PPDU. It will be noted that this field and the Pseudorandom number sequence seed field are the two options for sharing the same scrambling seed.

A Start Index field is set to indicates the index of the number in the number sequence generated by the Pseudorandom number sequence seed. The receiver STA should use the number whose index is indicated in this field as the same scrambling seed during the first SP. During the time of the next SP, the STA should use the next number in the number sequence as the same scrambling seed to transmit the identical PPDU.

2.3. Scrambling Seed Indication Frame

Figure 5:
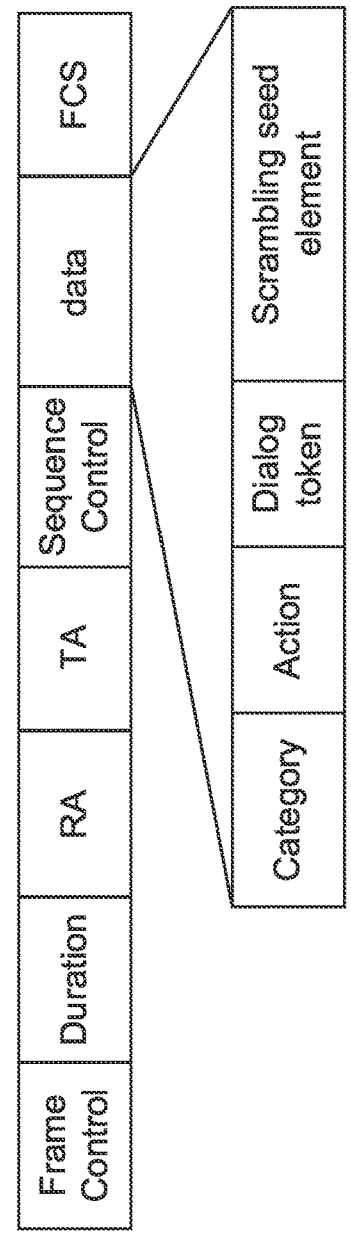
FIG. 5 is a data field diagram of a scrambling seed indication frame element, according to at least one embodiment of the present disclosure.

FIG. 5 illustrates an example embodiment 90 of the format for a scrambling seed indication frame, which carries the scrambling seed element to receiver STAs which can use the same scrambling seed to transmit an identical PPDU.

Frame Control field indicates the type of the frame, which can be used to indicate it is an action frame. A Duration field contains NAV information used for Carrier Sense Multiple Access/Collision Avoidance (CSMA/CA) channel access. A Receiver Address (RA) field contains an address for the recipient of the frame. A Transmitter Address (TA) field contains the address of the STA that transmitted the frame. A Sequence control field contains the fragment number and the sequence number of the frame. A data field is shown which is used for carrying scrambling seed information as described below. A Frame Check Sequence (FCS) is a field containing error-detecting code.

The data field contains a number of subfields as follows. Category and Action subfields indicate this frame is a Scrambling seed indication frame. A Dialog token subfield is set to identify the Scrambling seed indication frame. A Scrambling seed element is set to allow a receiving STA(s) of the frame to use the same scrambling seed to transmit an identical PPDU.

4. EXAMPLE OPERATIONS

Following are provided by way of example and not limitation to illustrate the manner in which the present disclosure can operate under actual conditions.

4.1. Example 1

Figure 6:
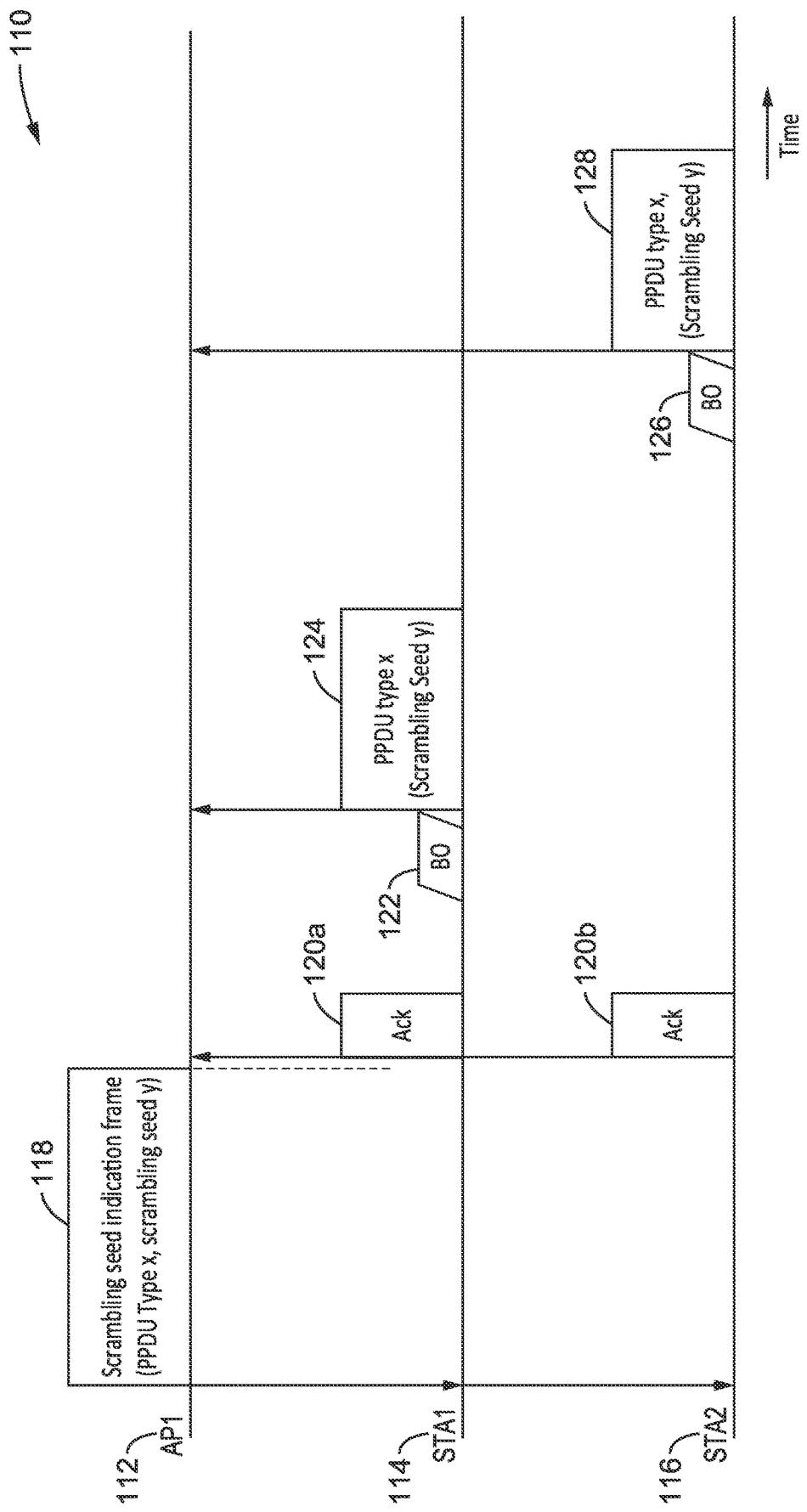
FIG. 6 is a communications diagram (Example 1) of a non-AP STAs using the same scrambling seed to transmit an identical PPDU to demonstrate multiple non-AP STAs using a same scrambling seed in transmitting an identical PPDU, according to at least one embodiment of the present disclosure.

FIG. 6 illustrates an example embodiment 110 of a non-AP STAs using the same scrambling seed to transmit an identical PPDU to demonstrate multiple non-AP STA operations. The figure depicts interactions between AP1 112, STA1 114 and STA2 116.

AP1 transmits a scrambling seed indication frame 118 to two of its associated STAs, depicted here as STA1 and STA2. The PPDU type of the identical PPDU is denoted as x, while the scrambling seed is denoted as y, to transmit the identical PPDU is indicated in the scrambling seed element in the scrambling seed indication frame.

STA1 and STA2 transmit an Ack 120a, 120b, to acknowledge receiving the scrambling seed frame. STA1 performs a backoff (BO) 122, obtains the channel and sends PPDU type x with scrambling seed y 124 to AP1. After this, STA2 is also seen performing BO 126 and sending the same PPDU type x with scrambling seedy 128.

When STA1 or STA2 transmit the identical PPDU (PPDU type x as shown in the figure) as the first PPDU during its TXOP, it uses the scrambling seed y to scramble the identical PPDU and transmit.

In this example, the SP schedule field is not present in the scrambling seed element within the scrambling seed indication frame, and the receiver STAs of the scrambling seed indication frame use the same scrambling seed to transmit that identical PPDU all the time.

If the SP schedule field is present in the scrambling seed element in the scrambling seed indication frame, then the receiver STAs of the scrambling seed indication frame may use the same scrambling seed to transmit that identical PPDU only during the SPs.

4.2. Example 2

Figure 7:
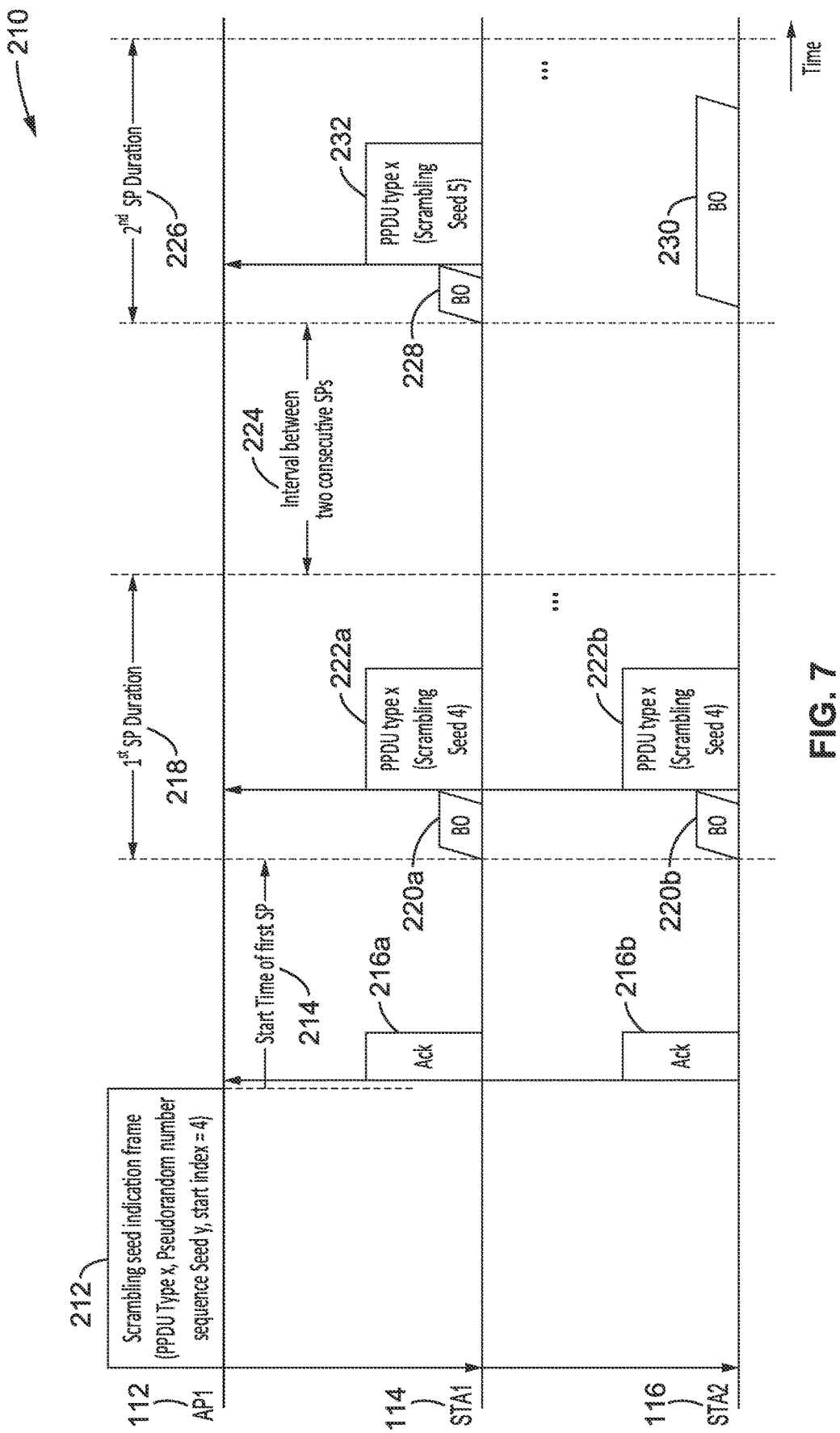
FIG. 7 is a communications diagram (Example 2) of non-AP STAs using the pseudorandom number sequence seed to generate the same scrambling seed on multiple STAs, according to at least one embodiment of the present disclosure.

FIG. 7 illustrates an example embodiment 210 of non-AP STAs using the pseudorandom number sequence seed to generate the same scrambling seed on multiple STAs.

In the figure is seen an example of the AP sharing a pseudorandom number sequence seed with multiple STAs so that those STAs generate an identical pseudorandom number sequence that can be used with the same scrambling seed. As in the previous figure interactions are depicted between AP1 112, STA1 114 and STA2 116.

AP1 transmits a scrambling seed indication frame 212 to two of its associated STAs, depicted as STA1 and STA2. The PPDU type of the identical PPDU, denoted as x, is indicated in the scrambling seed element in the scrambling seed indication frame. In the scrambling seed element, the pseudorandom number sequence seed, denoted as y, that STA1 and STA2 can use to generate an identical pseudorandom number sequence (using the same pseudorandom number generation algorithm). The SP schedule in the scrambling seed element is present in this example for indicating the time for using the same scrambling seed.

The start index field in the scrambling seed element is set to 4 which indicates that during the first SP, STA1 and STA2 use the 4th number in the pseudorandom number sequence as the same scrambling seed to transmit the identical PPDU (PPDU type x as shown in the figure) during the first SP.

The example shows STA1 and STA2 Acknowledging 216a, 216b receipt of the scrambling seed information frame 212. Then at the start time 214 of the first SP both STA1 and STA2 perform BOs 220a, 220b, which starts a first SP Duration 218, during which each STA transmits a PPDU type x with scrambling seed 4 222a, 222b.

During the second SP, STA1 and STA2 use the next number, exemplified in this example as the fifth number, in the pseudorandom number sequence as the same scrambling seed to transmit the identical PPDU. The second SP duration 226 is shown occurring after interval 224 between two consecutive SPs. Then STA1 performs BO 228 and transmits 232 PPDU type x with scrambling seen 5. STA2 started its backoff, after that of STA1, wherein it was not able to obtain the channel to send its PPDU simultaneously with STA1; whereby STA2 is backing off until the channel becomes ready.

4.3. Example 3

Figure 8:
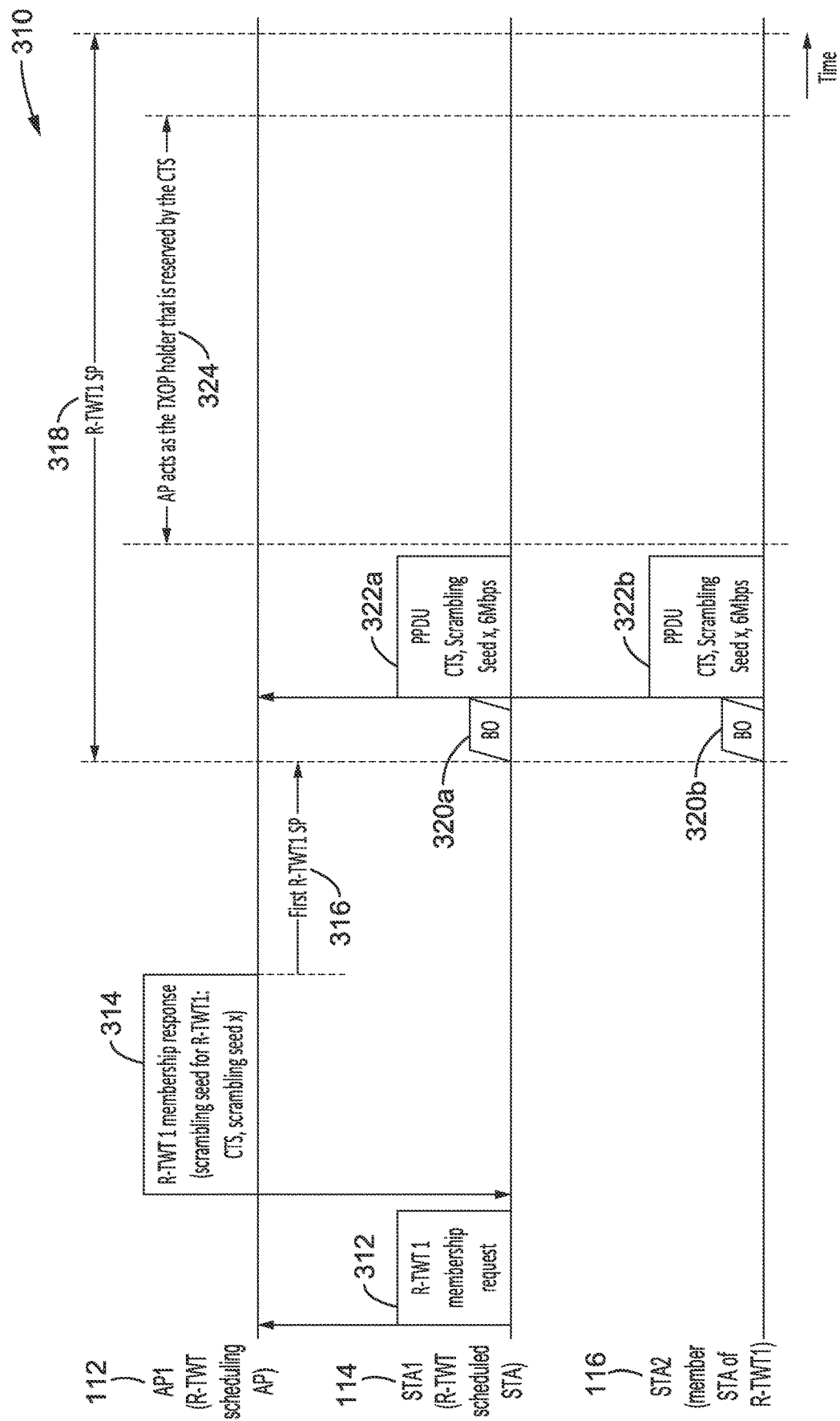
FIG. 8 is a communications diagram (Example 3) of non-AP STAs using the same scrambling seed during R-TWT SPs, according to at least one embodiment of the present disclosure.

FIG. 8 illustrates an example embodiment 310 of non-AP STAs using the same scrambling seed during R-TWT SPs. In this example, AP1 sends an embedded scrambling seed element within the R-TWT membership response frame to allow the member STAs of the R-TWT to use the same scrambling seed during the R-TWT SPs. This figure also depicts interactions between AP1 112, STA1 114 and STA2 116.

STA1 sends a membership request 312 for R-TWT1. Then, AP1 accepts the membership request and transmits a scrambling seed element within an R-TWT1 membership response frame 314. The scrambling seed element indicates that the member STAs of R-TWT1 should use the scrambling seed x to transmit a Clear-To-Send (CTS) frame to AP1 when they access the channel during the R-TWT1 SPs.

The time 316 preceding the first R-TWT1 SP 318 is indicated. Then when R-TWT1 SP 318 commences, STA1 and STA2 perform BOs 320a, 320b, obtain the channel, and both transmit PPDU CTS 322a, 322b using scrambling seen x at 6 Mbps.

During the R-TWT1 SP, STA1 and STA2 contend for the channel at the same time. As shown in the figure, they may gain channel access at the same time. Then, they transmit a PPDU carrying the CTS frame (only) to AP1 at the same data rate (such as 6 Mbps shown in the figure) and by using the same scrambling seed x to scramble the PPDU. Also, the PPDU format of the PPDUs carrying the CTS frame transmitted by STA1 and STA2 is the same, and thus a collision does not occur when STA1 and STA2 transmit at the same time.

Once AP1 receives one CTS frame from any member STA of R-TWT1, it occupies the channel 324 and begins to operate in the role of the TXOP holder during the TXOP time reserved by the CTS frame. AP1 may extend the TXOP until the end of R-TWT1 SP.

It should be noted that the CTS frames transmitted by different member STAs are identical. The RA field in the CTS frame should be set to the same, such as the AP's MAC address. The duration field in the CTS frame (i.e., the TXOP time reserved by CTS frame) should also be the same. This value can be predetermined, wherein the TXOP limit of the primacy AC can be ignored. When multiple Enhanced Distributed Channel Access Functions (EDCAFs) of different Access Classes (ACs) contend for the channel, any EDCAF sets the same duration field in the CTS frame. For example, the duration field of the CTS frame can be set to the time of a SIFS time (or a PIFS time) plus the duration of transmitting a basic trigger frame (or BSRP trigger frame) at 6 Mbps.

It should be noted that the PPDU carrying a CTS frame may have to use the non-HT PPDU format (or non-HT duplicate PPDU format); so that the CTS can be understood by legacy STAs, which only use the non-HT PPDU format.

When a member STA gains channel access on the secondary channel, it transmits the identical PPDU carrying a CTS frame over a 20 MHz band the same as it would on the 40 MHz primary channel.

In at least one embodiment/mode/option, when the scrambling seed element is in a R-TWT membership response frame, the SP schedule field is not present in the element and the same scrambling seed is used for R-TWT SPs only.

4. Summary Outline of Embodiments

Wireless communication system/apparatus performing transmission of frames between the MAC layers of the IEEE 802.11 network, performing transmission of PPDUs between the PHY layers of the IEEE 802.11 network, STAs using CSMA/CA for channel contention, comprising: (a) multiple transmitter STAs transmit a same PPDU to the same receiver STA; (b) those STAs scramble the data field of the PPDU with the same scrambling seed (i.e., the initial state of the scrambler); and (c) those STAs transmit the PPDU using the same MCS.

The STAs could share the same scrambling seed before transmitting the same PPDU.

The STAs could: (a) generate a same random number sequence with a same seed; or (b) Pick the random number of the same index in the sequence as the scrambling seed.

The STAs can pick the same index in the random number sequence depending on time.

The scrambling seed could be generated depending on the TSF time.

The scrambling seed could be generated depending on the R-TWT ID.

The scrambling seed could be generated depending on the R-TWT schedule.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication station (STA) performing transmission of physical layer protocol data units (PPDUs) between the physical (PHY) layers of the IEEE 802.11 network, as a STA which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d)

wherein said instructions, when executed by the processor, perform steps of a wireless communications protocol for said AP or non-AP using a scrambling seed when performing network communications, comprising: (d)(i) wherein a STA operating as the AP, sends a scrambling seed indication within a frame communicated to other STAs on the network; and (d)(ii) wherein said scrambling seed indication allows said other STAs to scramble a data field of a PPDU with an identical scrambling seed, and to transmit the PPDU using the same modulation and coding scheme (MCS).

An apparatus for wireless communication in a network, the apparatus comprising: (a) a wireless communication station (STA) performing transmission of physical layer protocol data units (PPDUs) between the physical (PHY) layers of the IEEE 802.11 network, as a STA which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said AP or non-AP using a scrambling seed when performing network communications, comprising: (d)(i) wherein a STA operating as the AP, sends a scrambling seed indication within a frame communicated to other STAs on the network; (d)(ii) wherein said scrambling seed indication allows said other STAs to scramble a data field of a PPDU with an identical scrambling seed, and to transmit the PPDU using the same modulation and coding scheme (MCS); and (d)(iii) wherein said other STAs share an identical scrambling seed before transmitting the same PPDU.

A method of performing wireless communication in a network, comprising: (a) performing transmission of physical layer protocol data units (PPDUs) between the physical (PHY) layers of the IEEE 802.11 network, from a station (STA), which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links, and in which the AP or non-AP uses a scrambling seed when performing network communications; (b) wherein a STA operating as the AP, sends a scrambling seed indication within a frame communicated to other STAs on the network; and (c) wherein said scrambling seed indication allows said other STAs to scramble a data field of a PPDU with an identical scrambling seed, and to transmit the PPDU using the same modulation and coding scheme (MCS).

The apparatus or method of any preceding implementation, wherein said other STAs share an identical scrambling seed before transmitting the same PPDU.

The apparatus or method of any preceding implementation, wherein said AP in sharing the scrambling seed allows said other STAs to either generate an identical random number sequence using an identical seed; or to choose a random number having an identical index in the sequence as the scrambling seed.

The apparatus or method of any preceding implementation, wherein said STAs use an identical pseudorandom number sequence generation algorithm with an identical seed to generate an identical pseudorandom number sequence.

The apparatus or method of any preceding implementation, wherein STAs select a random number having an identical index in the pseudorandom number sequence.

The apparatus or method of any preceding implementation, wherein the index of the random number can be changed depending on the timing synchronization function (TSF) time.

The apparatus or method of any preceding implementation, wherein the index is incremented periodically.

The apparatus or method of any preceding implementation, wherein the scrambling seed is generated depending on the timing synchronization function (TSF) time.

The apparatus or method of any preceding implementation, wherein the scrambling seed is generated depending on the R-TWT ID.

The apparatus or method of any preceding implementation, wherein the scrambling seed is generated based on a reserved-target wait time (R-TWT) schedule.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Contents of the first 7 bits of the Scrambling Sequence

| | | First 7 bits of scrambling sequence | | | | |
|---|---|---|---|---|---|---|
| Parameter. | Condition | B0 | B3 | B4 | B5 | B6 |
| TXVECTOR | CH_B is present and DY_B is not present | 5-bit pseudorandom nonzero integer if CH_B equals CBW20 and a 5-bit pseudorandom integer otherwise | | | | CH_B |
| TXVECTOR | CH_B and DY_B are both present | 4-bit pseudorandom non-zero int CH_B = CBW20 & DY_B = Static, & 4-bit pseudorandom int otherwise | | DY_B | | |
| RXVECTOR | CH_B and DY_B are both present | — | | DY_B | | CH_B INDICATOR |

Notes
CH_B == CH_BANDWIDTH_IN_NON_HT and DY_B == DYN_BANDWIDTH_IN_NON_HT

TABLE 2

TXVECTOR parameter CH_BANDWIDTH_IN_NON_HT values

| Enumerated value | Value |
| --- | --- |
| CBW20 | 0 |
| CBW40 | 1 |
| CBW80 | 2 |
| CBW160/CBW80 + 80 | 3 |

TABLE 3

RXVECTOR parameter CH_BANDWIDTH_IN_NON_HT values

| CH_B field of first value | dot11CurrentChannelCenter FrequencyIndex1 | RXVECTOR parameter CH_B |
| --- | --- | --- |
| 0 | 0 | CBW20 |
| 1 | 0 | CBW40 |
| 2 | 0 | CBW80 |
| 3 | 0 | CBW160 |
| 3 | 1 to 200 | CBW160/CBW80 + 80 |

CH_B == CH_BANDWIDTH_IN_NON_HT_INDICATOR

TABLE 4

DYN_BANDWIDTH_IN_NON_HT values

| Enumerated value | Value |
| --- | --- |
| Static | 0 |
| Dynamic | 1 |

TABLE 5

Contents of first 7 bits of Scrambling Sequence

| Parameter | First 7 bits of scrambling sequence (B0 → B6) | |
| --- | --- | --- |
| TXVECTOR | x-bit ps int generated by the Ps number sequence Seed | y-bit int generated depending on R-TWT ID/TST time/AP Address |
| RXVECTOR | - N/A - | y-bit int generated depending on R-TWT ID/TST time/AP Address | ps == pseudorandom

What is claimed is:

1. An apparatus for wireless communication in a network, the apparatus comprising:
(a) a wireless communication station (STA) performing transmission of physical layer protocol data units (PPDUs) between the physical (PHY) layers of the IEEE 802.11 network, as a STA which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;
(b) a processor coupled to said wireless communication circuit for operating on the WLAN;
(c) a non-transitory memory storing instructions executable by the processor for communicating with other STAs; and
(d) wherein said instructions, when executed by the processor, perform steps of a wireless communications protocol for said AP or non-AP using a scrambling seed when performing network communications, comprising:
(i) wherein a STA operating as the AP, sends a scrambling seed indication within a frame communicated to other STAs on the network; and
(ii) wherein said scrambling seed indication allows said other STAs to scramble a data field of a PPDU with an identical scrambling seed, and to transmit the PPDU using the same modulation and coding scheme (MCS).

2. The apparatus of claim 1, wherein said AP in sharing the scrambling seed allows said other STAs to either generate an identical random number sequence using an identical seed; or to choose a random number having an identical index in the sequence as the scrambling seed.

3. The apparatus of claim 2, wherein said STAs use an identical pseudorandom number sequence generation algorithm with an identical seed to generate an identical pseudorandom number sequence.

4. The apparatus of claim 3, wherein STAs select a random number having an identical index in the pseudorandom number sequence.

5. The apparatus of claim 4, wherein the index of the random number can be changed depending on the timing synchronization function (TSF) time.

6. The apparatus of claim 5, wherein the index is incremented periodically.

7. The apparatus of claim 1, wherein the scrambling seed is generated depending on the timing synchronization function (TSF) time.

8. The apparatus of claim 1, wherein the scrambling seed is generated depending on the R-TWT ID.

9. The apparatus of claim 1, wherein the scrambling seed is generated based on a reserved-target wait time (R-TWT) schedule.

10. An apparatus for wireless communication in a network, the apparatus comprising:
(a) a wireless communication station (STA) performing transmission of physical layer protocol data units (PPDUs) between the physical (PHY) layers of the IEEE 802.11 network, as a STA which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;
(b) a processor coupled to said wireless communication circuit for operating on the WLAN;
(c) a non-transitory memory storing instructions executable by the processor for communicating with other STAs; and
(d) wherein said instructions, when executed by the processor, perform steps of a wireless communications protocol for said AP or non-AP using a scrambling seed when performing network communications, comprising:
(i) wherein a STA operating as the AP, sends a scrambling seed indication within a frame communicated to other STAs on the network;
(ii) wherein said scrambling seed indication allows said other STAs to scramble a data field of a PPDU with an identical scrambling seed, and to transmit the PPDU using the same modulation and coding scheme (MCS); and (iii) wherein said other STAs share an identical scrambling seed before transmitting the same PPDU.

11. The apparatus of claim 10, wherein said AP in sharing the scrambling seed allows said other STAs to either generate an identical random number sequence using an identical seed; or to choose a random number having an identical index in the sequence as the scrambling seed.

12. The apparatus of claim 10, wherein said STAs use an identical pseudorandom number sequence generation algorithm with an identical seed to generate an identical pseudorandom number sequence.

13. The apparatus of claim 10, wherein STAs select a random number having an identical index in the pseudorandom number sequence.

14. The apparatus of claim 13, wherein the index of the random number can be changed depending on the timing synchronization function (TSF) time.

15. The apparatus of claim 14, wherein the index is incremented periodically.

16. The apparatus of claim 10, wherein the scrambling seed is generated depending on the timing synchronization function (TSF) time.

17. The apparatus of claim 10, wherein the scrambling seed is generated depending on the R-TWT ID.

18. The apparatus of claim 10, wherein the scrambling seed is generated based on a reserved-target wait time (R-TWT) schedule.

19. A method of performing wireless communication in a network, comprising:

(a) performing transmission of physical layer protocol data units (PPDUs) between the physical (PHY) layers of the IEEE 802.11 network, from a station (STA), which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links, and in which the AP or non-AP uses a scrambling seed when performing network communications;

(b) wherein a STA operating as the AP, sends a scrambling seed indication within a frame communicated to other STAs on the network; and (c) wherein said scrambling seed indication allows said other STAs to scramble a data field of a PPDU with an identical scrambling seed, and to transmit the PPDU using the same modulation and coding scheme (MCS).

* * * * *